United States Patent [19]

Winand

[11] 4,263,265
[45] Apr. 21, 1981

[54] PROCESS FOR OBTAINING A DESULFATED PHOSPHORIC ACID FOR USE IN FOODS AND BEVERAGES

[75] Inventor: Louis Winand, Bourgachard, France

[73] Assignee: Rhone-Poulenc Industries, Paris, France

[21] Appl. No.: 78,675

[22] Filed: Sep. 25, 1979

[30] Foreign Application Priority Data

Sep. 29, 1978 [FR] France ................. 78 27887

[51] Int. Cl.³ .................. C01B 25/16; C01F 1/00
[52] U.S. Cl. .................. 423/321 S; 423/166
[58] Field of Search ............. 423/321 S, 321 R, 166

[56] References Cited

U.S. PATENT DOCUMENTS

| | | | |
|---|---|---|---|
| 3,607,029 | 9/1971 | Goret et al. | 423/321 S |
| 3,784,678 | 1/1974 | Beltz et al. | 423/321 S |
| 4,041,134 | 8/1977 | Kikuchi et al. | 423/321 S |
| 4,070,443 | 1/1978 | Kikuchi et al. | 423/321 S |
| 4,118,462 | 10/1978 | Desire et al. | 423/321 S |

*Primary Examiner*—O. R. Vertiz
*Assistant Examiner*—Gregory A. Heller
*Attorney, Agent, or Firm*—Burns, Doane, Swecker & Mathis

[57] ABSTRACT

A continuous process for removing sulfate ions from a substantially water-insoluble organic phase containing phosphoric acid and sulfuric acid is described. The organic phase is treated countercurrently in a first zone with an aqueous solution originating in a third contact zone, the organic phase issuing from the first zone is treated in a second zone with an aqueous solution containing barium ions, then the resultant organic phase is treated in a third zone with water. The aqueous phase exiting from the second zone is separated from the BaSO$_4$ precipitate, recharged with barium and recycled into the second contact zone. The phosphoric acid thus obtained is suitable for use in human foods and beverages.

24 Claims, 1 Drawing Figure

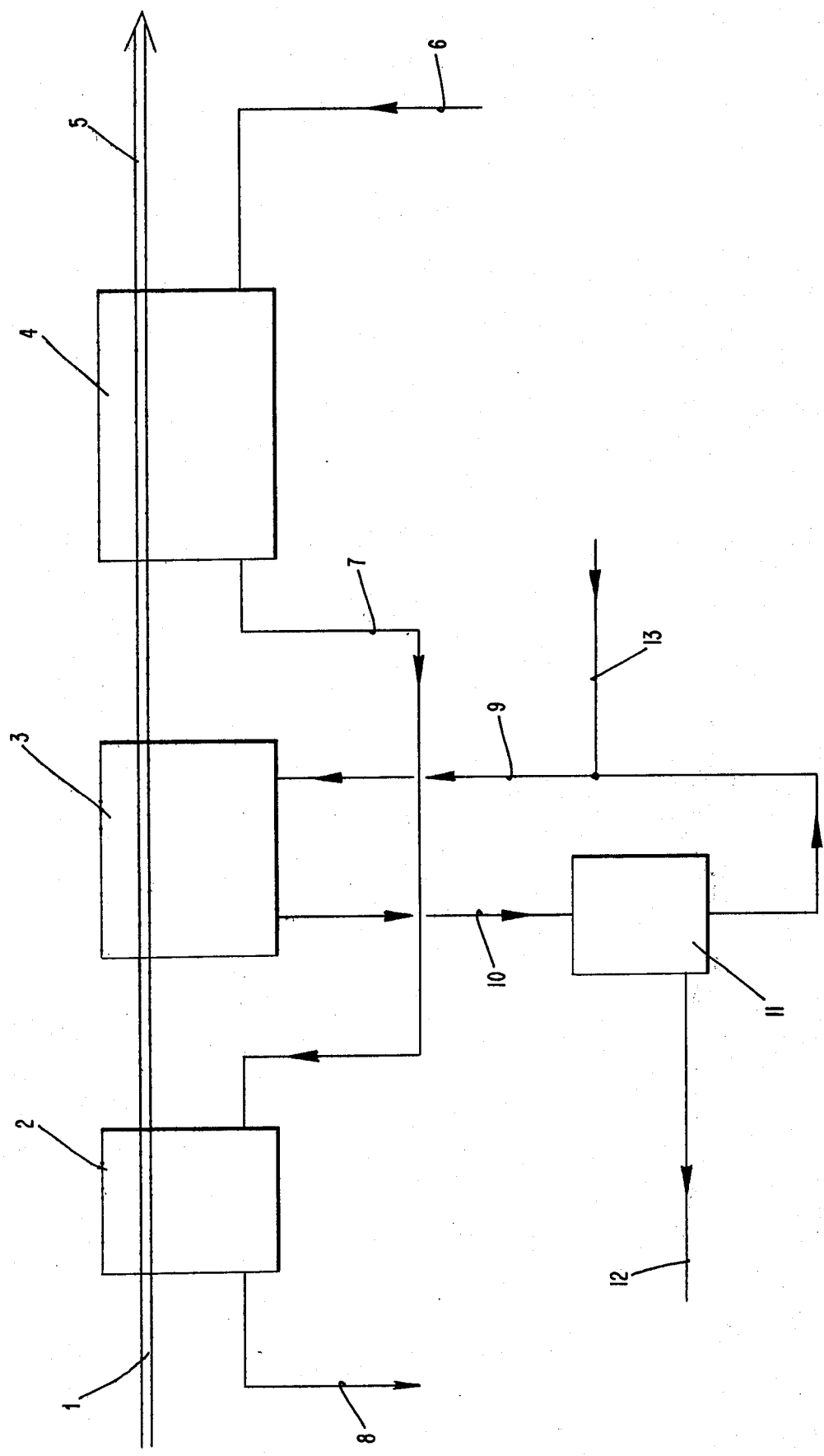

PROCESS FOR OBTAINING A DESULFATED PHOSPHORIC ACID FOR USE IN FOODS AND BEVERAGES

BACKGROUND OF THE INVENTION

1. Field of the Invention

The present invention concerns a process for the elimination of sulfate ions from impure phosphoric acid. More particularly, the present invention concerns the elimination of sulfate ions during the purification of impure phosphoric acid by means of a liquid-liquid extraction process. According to the invention, a purified and highly desulfated phosphoric acid is obtained from a raw wet process phosphoric acid, said purified acid being usable in the human food industry.

2. Description of the Prior Art

It is known to prepare phosphoric acid according to a wet process comprising the attack of a strong acid such as sulfuric acid on phosphate ore. After separation by filtration of the insoluble residue and of the gypsum formed, there is obtained an impure solution of phosphoric acid containing numerous anionic and cationic impurities, particularly sulfate ions originating from the excess sulfuric acid which is introduced during the attack on the ore so as to obtain maximum yields in the solubilization of the calcium phosphate. To obtain a relatively purified aqueous solution of phosphoric acid, a subsequent liquid-liquid extraction process is usually applied to the raw acid utilizing an organic solvent which is substantially insoluble in water, such as alkyl phosphates or aliphatic alcohols having 4 to 9 carbon atoms. In the course of this extraction, in view of the partition coefficient of the acids between the aqueous phase and the solvent phase, a considerable portion of the sulfate ions follow the phosphate ions into the organic phase. After washing the organic phase containing the acids with water or a dilute phosphoric acid, the organic phase is re-extracted with water to yield an aqueous solution of purified phosphoric acid, which still has a sizable sulfuric acid content. Thus, in French Pat. No. 1.531.487 in the name of Jean Goret and Louis Winand (corresponding to U.S. Pat. No. 3,607,029, incorporated by reference herein in its entirety and relied upon), there is obtained at the completion of the process, after extraction with tributyl phosphate in the presence of excess sulfuric acid (excess sulfuric acid being utilized in order to improve the yield in the extraction of the phosphoric acid), a phosphoric acid solution having an $H_2SO_4$ content with respect to $P_2O_5$ of 0.5% or 5000 ppm. Operating under critical conditions, this process provides at best a content by weight of $SO_4$—in relation to $P_2O_5$ of 500 to 1000 ppm. However, the food industry increasingly requires a highly desulfated phosphoric acid containing less than 100 ppm $SO_4$ by weight with respect to $P_2O_5$. Such is notably the case for certain nonalcoholic beverages, since an $SO_4$ content in excess of 100 ppm is prohibited by current legislation.

SUMMARY OF THE INVENTION

The object of the present invention is to provide a process for the treatment of an organic phase substantially insoluble in water and containing phosphoric acid and sulfuric acid, to remove sulfate ions therefrom. Removal of the sulfate ions is accomplished by means of an aqueous solution containing barium ions. Thus, the present invention constitutes an improvement in the process for the preparation of wet process phosphoric acid comprising the extraction of an impure aqueous solution of phosphoric acid, obtained from the attack of sulfuric acid on natural phosphated rock, with a substantially water-insoluble organic solvent, to afford a substantially water-insoluble organic phase containing phosphoric acid contaminated with sulfuric acid, said improvement comprising: contacting said organic phase with an aqueous solution containing barium ions, whereby sulfate ions are extracted from the organic phase and barium sulfate is precipitated into the aqueous phase; separating the organic phase and the aqueous phase containing barium sulfate precipitate; and recovering the organic phase containing phosphoric acid substantially reduced in sulfate ion content.

In a preferred embodiment, the present invention provides a process for the countercurrent treatment of an organic phase comprising a substantially water-insoluble organic solvent containing phosphoric acid and sulfuric acid, said process comprising successively: contacting said organic phase in a first liquid-liquid contact zone with an aqueous solution issuing from the third contact zone hereinafter, then separating the phases; contacting the organic phase issuing from the first contact zone in a second liquid-liquid contact zone with an aqueous solution containing barium ions, whereby the sulfate ions are extracted from the organic phase and barium sulfate is precipitated in the aqueous phase, then separating the phases; contacting the organic phase issuing from the second contact zone in a third liquid-liquid contact zone with water, then separating the phases; and recovering an organic solution of the solvent containing phosphoric acid with less than 100 ppm by weight of sulfate ions with respect to the phosphoric acid expressed in $P_2O_5$.

BRIEF DESCRIPTION OF THE DRAWING

The FIGURE is a schematic diagram of a principal mode of embodiment of the invention.

DETAILED DESCRIPTION OF THE INVENTION

The invention will be better understood with reference to the accompanying drawing discussed in detail below.

Referring to the FIGURE, the organic solution of the phosphoric acid containing sulfuric acid is introduced through 1 into a first contact zone, 2. Also, an aqueous solution 7, issuing from the third contact zone as will be explained hereinafter, is introduced into 2. After separation of the phases, the aqueous phase, possibly containing a slight precipitate of $BaSO_4$, exits via 8, while the exiting organic solution feeds a second liquid-liquid contact zone where it is treated with a solution containing barium ions entering via 9. After separation of the liquid phases in this second zone, the aqueous solution containing precipitated barium sulfate is passed via 10 into a separation apparatus 11, from which the solid barium sulfate is eliminated through 12 while the filtrate, after the addition of barium ions through 13, constitutes the aqueous phase 9 feeding zone 3. Additionally, the organic phase exiting from the second contact zone 3 feeds a third contact zone 4 where it is contacted with water or an aqueous solution of phosphoric acid entering via 6. After the separation of the phases in this third zone, the organic phase exiting via 5 represents the production. The exiting organic phase is subsequently treated to recover the phosphoric acid, for example, by extraction with water or with a solution of an alkali metal, ammonium or alkaline earth metal hydroxide or phosphate, which treatment does not constitute part of the present invention.

The term "substantially water-insoluble organic solvent" as used herein is understood to mean solvents capable of extracting phosphoric acid from its aqueous solution. Suitable organic solvents are known in the art, for example from U.S. Pat. No. 3,607,029 and U.S. Pat. No. 4,065,547. Especially useful are the phosphoric triesters of monovalent alcohols and the $C_4$–$C_9$ aliphatic alcohols. Among these solvents, tributyl phosphate or isobutyl alcohol is preferred. The organic phase entering the process generally originates in the extraction of a raw wet process phosphoric acid. Thus, the organic phase introduced into the first contact zone preferably results from liquid-liquid extraction of an impure aqueous solution of phosphoric acid, obtained from the attack of sulfuric acid on natural phosphated rock, with a substantially water-insoluble organic solvent. In addition to the solvent, the initial organic phase contains phosphoric acid at a concentration generally between about 20 g and about 200 g per liter of $H_3PO_4$, although the indicated range does not constitute a limitation. Similarly, the initial organic phase contains sulfuric acid in an amount generally between about 0.01 and about 10 g per liter of the phase, although, again, the range does not constitute a limitation.

The term "liquid-liquid contact zone" as used herein signifies equipment well-known in the art, such as mixer-decanters, packed or pulsating columns or any other suitable equipment, the contact being effected preferably in a countercurrent manner. Usually, the contact zones consist of batteries of such equipment mounted in series. Thus, as an illustration, contact zone 2 may comprise one or two mixer-decanters, zone 3 one or two mixer-decanters and zone 4 one or more mixer-decanters.

The ratio of the flow rate of the organic phase to that of the aqueous solution in each of the contact zones is not critical. However, in order to achieve the required purity with respect to $SO_4^{--}$ while maintaining a good yield in phosphoric acid, the organic/aqueous flow rate ratios in zones 2 and 4 will generally be between 5/1 and 20/1. The ratio of the flows of the phases in zone 3 is not important for yield or purity of the phosphoric acid, but it is generally between 2/1 and 20/1 (organic/aqueous). The temperature in the contact zones also is not critical. However, the process is conveniently conducted at a temperature of from about ambient temperature to about 70° C.

The aqueous solution feeding contact zone 3 contains barium ions. The concentration of barium in the aqueous solution is not critical; however, it will be calculated so that there is a stoichiometric excess of barium ions in relation to the sulfuric acid present in the organic phase, bearing in mind the ratio of the flow rates of the phases. Thus, in practice, the solution usually contains barium in an amount preferably between about 0.2 and about 40 g/liter of solution. The barium ions are introduced by means of a barium salt, such as the carbonate, etc., or in the form of barite. Following contact of the phases in contact zone 3, the aqueous phase contains a fine precipitate of $BaSO_4$. After phase separation, the aqueous phase is treated in a known separation apparatus, such as centrifuge equipment or suitable filtration equipment possibly containing a foundation layer, such as a filtration bed consisting of, for example, talc or fine silica. The $BaSO_4$ precipitate in the aqueous phase which is obtained according to the invention is a fine precipitate which readily remains in suspension in the aqueous phase and consequently does not create harmful deposits in the contact zone. After separation of the $BaSO_4$ from the aqueous phase, the titer of the said aqueous phase in barium ions is corrected by the addition of barium ions, e.g., in the solid form such as barium carbonate or barite or in the form of an aqueous solution of barite. The solution is then recycled into zone 3. It should be understood that during the conduct of the process, the aqueous phase containing barium is enriched in phosphoric acid by extraction of said acid into zone 3 tending toward a constant value depending on the titer in $H_3PO_4$ of the organic phase. In that case, in order to reduce the transfer in $H_3PO_4$, a barium ion solution containing phosphoric acid may be used.

The organic phase leaving zone 3 is passed into zone 4 where it is washed with water in a countercurrent manner. Zone 4 comprises at least one mixer-decanter, but preferably has two or more, in order to eliminate any barium sulfate that may be entrained by the organic phase leaving zone 3. At 5, an organic phase of phosphoric acid is obtained, said organic phase having a titer in $H_3PO_4$ generally between about 10 g and about 200 g per liter, and containing $H_2SO_4$ in an amount by weight in relation to $P_2O_5$ of less than 100 ppm. The residual barium content of the organic phase is such that the ratio of $Ba/P_2O_5$ is generally between about 10 and 3 ppm, preferably less than 5 ppm.

The organic phase 5 is subsequently exposed to another treatment so as to recover $H_3PO_4$ either in the form of an aqueous solution of phosphoric acid or of one of its salts.

The aqueous phase 7 leaving zone 4 feeds into zone 2. After separation of the phases in zone 2, an aqueous phase 8, possibly containing a slight precipitate of $BaSO_4$, is recovered; it is generally returned to the initial extraction together with the raw phosphoric acid.

The invention is further illustrated by the following examples, wherein percentages are expressed by weight, unless otherwise indicated. However, it is to be understood that these examples are given by way of illustration only and are not to be construed as limiting the invention either in spirit or in scope as many modifications both in materials and in method will be apparent to those skilled in the art.

COMPARATIVE EXAMPLE

Wet process phosphoric acid originating from the attack of sulfuric acid on Morrocan phosphate rock and having the following characteristics:

| density | 1.52 |
|---|---|
| $P_2O_5$ | 45.5% |
| $H_2SO_4$ | 2.3% |
| iron | 0.20% |
| aluminum | 0.13% | is utilized. That acid is contacted with tributyl phosphate, in countercurrent manner, in a battery of mixer-decanters. The tributyl phosphate extract, which contains 110 g/liter $H_3PO_4$ and 1.5 g $H_2SO_4$ per liter, is then washed with water, in countercurrent manner, in a battery comprising six mixer-decanters, the ratio of the flows of organic phase to aqueous phase being 13 and the temperature being 60° C. After leaving the battery, the organic solution has a $SO_4/P_2O_5$ content by weight of 950 ppm.

EXAMPLE 1

The organic extract of the comparative example is treated according to the process of the present invention at the same temperature. The organic phase is treated in countercurrent manner in zone 2, which consists of a battery of two mixer-decanters, with the aqueous solution exiting from zone 4, the ratio of the flows of organic phase to aqueous phase being 11/0.8. Following the separation of the phases, the organic phase feeds the battery 3, comprising two mixer-decanters, wherein it is contacted with an aqueous solution containing:

| | |
|---|---|
| $H_3PO_4$ | 40% |
| barium ions | 7 g per liter | the ratio of the flows of the organic phase to the aqueous phase being 3/1. After phase separation, the aqueous phase containing the $BaSO_4$ precipitate is filtered under pressure in a filter with a foundation layer of silica and asbestos. The filtrate is then recharged with barium ions, by means of the addition of $BaCO_3$, at a titer of 7 g per liter of barium, and the solution is recycled into zone 3. The organic phase leaving zone 3 feeds contact zone 4, which is a battery of three mixer-decanters, where it is contacted with water, the ratio of the flows of the phases being identical to that of zone 2. After separation, the exiting aqueous phase feeds into zone 2, while the organic phase which constitutes the production is recovered. Its composition is as follows:

| | |
|---|---|
| $H_3PO_4$ | 70 g per liter |
| $H_2SO_4$ | 0.004 g per liter |
| Ba | 0.00015 g per liter |
| | (3 ppm/$P_2O_5$) |

The organic phase is subsequently extracted with water to recover the phosphoric acid contained therein. The resulting aqueous phosphoric acid solution may be used in the food industry, where it is especially useful in the manufacture of nonalcoholic beverages.

While the invention has been described in terms of various preferred embodiments, the skilled artisan will appreciate that various modifications, substitutions, omissions and additions may be made without departing from the spirit thereof. Accordingly, it is intended that the scope of the present invention be limited solely by the scope of the following claims.

What is claimed is:

1. In a process for the preparation of wet process phosphoric acid comprising the extraction of an impure aqueous solution of phosphoric acid, obtained from the attack of sulfuric acid on natural phosphated rock, with a substantially water-insoluble organic solvent, to afford a substantially water-insoluble organic phase containing phosphoric acid contaminated with sulfuric acid, followed by re-extraction of said substantially water-insoluble organic phase with an aqueous phase, and separation of the aqueous phase containing purified phosphoric acid from the organic solvent phase; the improvement comprising: contacting said substantially water-insoluble organic phase containing phosphoric acid contaminated with sulfuric acid with an aqueous solution containing a stoichiometric excess of barium ions relative to the amount of sulfate ions in the organic phase, whereby sulfate ions are extracted from the organic phase and barium sulfate is precipitated into the aqueous phase; separating the organic phase and the aqueous phase; and recovering the organic phase containing phosphoric acid substantially reduced in sulfate ion content, the recovered organic phase containing phosphoric acid having a $SO_4/P_2O_5$ weight ratio of less than 100 ppm and being substantially free of barium ions.

2. The process according to claim 1 wherein the substantially water-insoluble organic phase containing phosphoric acid contaminated with sulfuric acid comprises an organic solvent selected from the group consisting of trialkyl phosphates and aliphatic alcohols having 4 to 9 carbon atoms.

3. The process according to claim 2 wherein the organic solvent is tributyl phosphate or isobutyl alcohol.

4. The process according to claim 1 wherein the substantially water-insoluble organic phase containing phosphoric acid contaminated with sulfuric acid has a phosphoric acid concentration of between about 20 g and about 200 g per liter and a sulfuric acid concentration of between about 0.01 g and about 10 g per liter.

5. A continuous process for removing sulfate ions from a substantially water-insoluble organic phase containing phosphoric acid contaminated with sulfuric acid which comprises the steps of:
 (a) contacting said organic phase in a first liquid-liquid contact zone with an aqueous solution issuing from the third liquid-liquid contact zone employed in step (c) below, and then separating the organic phase and the aqueous phase;
 (b) contacting the organic phase issuing from the first contact zone in a second liquid-liquid contact zone with an aqueous solution containing a stoichiometric excess of barium ions relative to the amount of sulfate ions in the organic phase, whereby sulfate ions are extracted from the organic phase and barium sulfate is precipitated into the aqueous phase, and then separating the organic phase and the aqueous phase containing barium sulfate precipitate;
 (c) contacting the organic phase issuing from the second contact zone in a third liquid-liquid contact zone with water or with an aqueous solution of phosphoric acid, then separating the organic phase and the aqueous phase, returning the aqueous phase to the first contact zone, and recovering the organic phase containing phosphoric acid substantially reduced in sulfate ion content, the recovered organic phase containing phosphoric acid having a $SO_4/P_2O_5$ weight ratio of less than 100 ppm and being substantially free of barium ions.

6. The process according to claim 5 wherein the organic phase introduced into the first contact zone results from liquid-liquid extraction of an impure aqueous solution of phosphoric acid, obtained from the attack of sulfuric acid on natural phosphated rock, with a substantially water-insoluble organic solvent.

7. The process according to claim 5, or 6, wherein the organic phase introduced into the first contact zone comprises an organic solvent selected from the group consisting of trialkyl phosphates and aliphatic alcohols having 4 to 9 carbon atoms.

8. The process according to claim 7 wherein the organic solvent is tributyl phosphate.

9. The process according to claim 7 wherein the organic solvent is isobutyl alcohol.

10. The process according to claim 5 wherein the organic phase introduced into the first contact zone has a phosphoric acid concentration of between about 20 g and about 200 g per liter and a sulfuric acid concentration of between about 0.01 g and about 10 g per liter.

11. The process according to claim 5 wherein the organic phase introduced into the first contact zone comprises an organic solvent selected from the group consisting of trialkyl phosphates and aliphatic alcohols having 4 to 9 carbon atoms, and has a phosphoric acid concentration of between about 20 g and about 200 g per liter, and a sulfuric acid concentration of between about 0.01 g and about 10 g per liter.

12. The process according to claim 11 wherein the organic solvent is tributyl phosphate or isobutyl alcohol.

13. The process according to claim 5 wherein each of the three contact zones comprises at least one mixer-decanter.

14. The process according to claim 6 wherein the ratio of the flows of the organic phase to the aqueous phase in the first contact zone is between about 5/1 and 20/1, and the ratio of the flows of the organic phase to the aqueous phase in the third contact zone is between about 5/1 and 20/1.

15. The process according to claim 17 wherein the ratio of the flows of the organic phase to the aqueous phase in the second contact zone is between about 2/1 and 20/1.

16. The process according to claim 5, 6, 10, 11, 12, 13, 14 or 15 wherein the aqueous solution entering the second contact zone has a barium ion concentration of between about 0.2 and about 40 g per liter.

17. The process according to claim 16 wherein the aqueous phase issuing from the second contact zone and containing barium sulfate precipitate is filtered, the filtrate is recharged with barium ions, and the recharged filtrate is recycled to feed the second contact zone.

18. The process according to claim 7 wherein the aqueous solution entering the second contact zone has a barium ion concentration of between about 0.2 and about 40 g per liter.

19. The process according to claim 18 wherein the aqueous phase issuing from the second contact zone and containing barium sulfate precipitate is filtered, the filtrate is recharged with barium ions, and the recharged filtrate is recycled to feed the second contact zone.

20. The process according to claim 11 wherein the ratio of the flows of the organic phase to the aqueous phase in the first contact zone is between about 5/1 and 20/1, and the ratio of the flows of the organic phase to the aqueous phase in the third contact zone is between about 5/1 and 20/1.

21. The process according to claim 20 wherein the aqueous solution entering the second contact zone has a barium ion concentration of between about 0.2 and about 40 g per liter.

22. The process according to claim 21 wherein the aqueous phase issuing from the second contact zone and containing barium sulfate precipitate is filtered, the filtrate is recharged with barium ions, and the recharged filtrate is recycled to feed the second contact zone.

23. The process according to claim 5 wherein each of the three contact zones comprises at least two mixer-decanters.

24. The process according to claim 5 wherein the flow of the organic phase is countercurrent to the flow of the aqueous phase in each of the three contact zones.

* * * * *